(12) United States Patent
Senda

(10) Patent No.: US 8,889,750 B2
(45) Date of Patent: Nov. 18, 2014

(54) EXPANDED POLYPROPYLENE RESIN PARTICLES, AND POLYPROPYLENE RESIN IN-MOLD-EXPANDED MOLDING

(75) Inventor: Kenichi Senda, Settsu (JP)

(73) Assignee: Kaneka Corporation, Osaka-Shi (JP)

( * ) Notice: Subject to any disclaimer, the term of this patent is extended or adjusted under 35 U.S.C. 154(b) by 0 days.

(21) Appl. No.: 13/982,783

(22) PCT Filed: Feb. 1, 2012

(86) PCT No.: PCT/JP2012/052280
§ 371 (c)(1),
(2), (4) Date: Jul. 31, 2013

(87) PCT Pub. No.: WO2012/105608
PCT Pub. Date: Aug. 9, 2012

(65) Prior Publication Data
US 2013/0310476 A1    Nov. 21, 2013

(30) Foreign Application Priority Data

Feb. 2, 2011    (JP) .................................. 2011-021181

(51) Int. Cl.
*C08J 9/16* (2006.01)
*C08J 9/18* (2006.01)
(Continued)

(52) U.S. Cl.
CPC ........... *C08F 210/06* (2013.01); *C08F 4/65912* (2013.01); *C08F 10/06* (2013.01); *C08F 4/65916* (2013.01); *C08J 9/232* (2013.01); *C08J 2323/12* (2013.01); *C08L 23/10* (2013.01); *Y10S 526/943* (2013.01)
USPC ................. 521/60; 521/56; 521/59; 521/134; 521/142; 521/143; 526/160; 526/170; 526/348; 526/351; 526/943

(58) Field of Classification Search
USPC ........ 521/56, 59, 60, 134, 142, 143; 526/348, 526/170, 351, 160, 943
See application file for complete search history.

(56) References Cited

U.S. PATENT DOCUMENTS

| 4,908,393 A | 3/1990 | Arai et al. |
| 2006/0222849 A1* | 10/2006 | Matsumura et al. .......... 428/407 |

(Continued)

FOREIGN PATENT DOCUMENTS

| JP | 1-242638 A | 9/1989 |
| JP | 7-258455 A | 10/1995 |

(Continued)

OTHER PUBLICATIONS

International Search Report for PCT/JP2012/052280 mailed on Apr. 24, 2012.

(Continued)

*Primary Examiner* — Kara Boyle
(74) *Attorney, Agent, or Firm* — Birch Stewart Kolasch & Birch, LLP

(57) ABSTRACT

Polypropylene resin expanded particles comprises a polypropylene resin as a base material resin, the polypropylene resin having at least three melting peaks on a DSC curve for a second temperature rise measured at a heating rate of 10 g/min with use of a heat flux differential scanning calorimeter (DSC), the at least three melting peaks including (i) a lowest temperature melting peak of 100° C. to 130° C. and (ii) a highest temperature melting peak of 140° C. to 160° C., the polypropylene resin having a resin DSC ratio change rate of 0.5%/° C. to 3.0%/° C., the expanded particles having two melting peaks in a DSC measurement made at a first temperature rise at the heating rate of 10 g/min, the two melting peaks including, (i) on a lower temperature side, a melting peak temperature of 100° C. to 130° C. and, (ii) on a higher temperature side, a melting peak temperature of 140° C. to 160° C.

6 Claims, 2 Drawing Sheets

(51) Int. Cl.

| | | |
|---|---|---|
| | *C08J 9/22* | (2006.01) |
| | *C08J 9/00* | (2006.01) |
| | *B29C 44/44* | (2006.01) |
| | *C08F 210/00* | (2006.01) |
| | *C08F 10/06* | (2006.01) |
| | *C08J 9/232* | (2006.01) |
| | *C08F 210/06* | (2006.01) |
| | *C08L 23/10* | (2006.01) |
| | *C08F 4/659* | (2006.01) |

(56) References Cited

U.S. PATENT DOCUMENTS

2010/0105787 A1* 4/2010 Sasaki et al. ............... 521/59
2012/0214890 A1 8/2012 Senda

FOREIGN PATENT DOCUMENTS

| | | |
|---|---|---|
| JP | 2001-341151 A | 12/2001 |
| JP | 2005-200450 A | 7/2005 |
| JP | 2006-96805 A | 4/2006 |
| JP | 2009-84304 A | 4/2009 |
| WO | WO 2008/139833 A1 | 11/2008 |
| WO | WO 2009/001626 A1 | 12/2008 |
| WO | WO 2009/051035 A1 | 4/2009 |
| WO | WO 2011/043032 A1 | 4/2011 |

OTHER PUBLICATIONS

Written Opinion of the International Searching Authority for PCT/JP2012/052280 mailed on Apr. 24, 2012 (Japanese).

International Preliminary Report on Patentability and an English translation of a Written Opinion of the International Searching Authority (Forms PCT/IB/338, PCT/IB/373, and PCT/ISA/237) for International Application No. PCT/JP2012/052280, dated Aug. 15, 2013.

\* cited by examiner

EXPANDED POLYPROPYLENE RESIN PARTICLES, AND POLYPROPYLENE RESIN IN-MOLD-EXPANDED MOLDING

TECHNICAL FIELD

The present invention relates to polypropylene resin expanded particles (expanded polypropylene resin particles). More specifically, the present invention relates to polypropylene resin expanded particles which can be suitably used as a material for an in-mold foaming molded product, that is, polypropylene resin expanded particles which (i) have only a small change in expanded particle DSC ratio, the change corresponding to a change in foaming temperature, (ii) can be molded at a low temperature, and (iii) have a wide range of mold heating steam pressure.

BACKGROUND ART

An in-mold foaming molded product which is obtained by (i) introducing polypropylene resin expanded particles into a mold and (ii) thermally molding the expanded particles with steam has characteristics such as freedom of shape, lightness in weight, and heat insulation efficiency which are advantages of an in-mold foaming molded product. An in-mold foaming molded product prepared from polypropylene resin expanded particles is compared with those prepared from expanded particles of similar synthetic resins as follows: An in-mold foaming molded product prepared from polypropylene resin expanded particles is superior to that prepared from polystyrene resin expanded particles in chemical resistance, heat resistance, and a distortion recovery rate after compression. In addition, an in-mold foaming molded product prepared from polypropylene resin expanded particles is superior to that prepared from polyethylene resin expanded particles in dimensional accuracy, heat resistance, and compressive strength. Because of those characteristics, an in-mold foaming molded product prepared from polypropylene resin expanded particles has various applications such as heat insulators, buffer packaging materials, automobile interior part materials, and core material for automobile bumpers.

However, in order to prepare an in-mold foaming molded product by fusing polypropylene resin expanded particles with each other in a mold, it is necessary to heat the polypropylene resin expanded particles at a high temperature, that is, under a high steam pressure in comparison with a case involving polystyrene resin expanded particles or polyethylene resin expanded particles. Therefore, the preparation of an in-mold foaming molded product is problematic in that it requires (i) a mold and a molding machine both tolerable against a high pressure and (ii) high steam cost for molding.

Most molding machines for in-mold foaming molding of polypropylene resin expanded particles have an upper limit of pressure resistance of approximately 0.4 MPa·G (gage pressure). Polypropylene resin expanded particles to be used for in-mold foaming molding are prepared from a resin which can be molded under the pressure up to the upper limit of the pressure resistance of molding machines. Generally, polypropylene resin expanded particles made of a propylene random copolymer having a melting point of approximately 140° C. to 150° C. are used.

However, due to a recent steep rise in fuel price etc., there is a demand for in-mold foaming molding performed at a lower temperature, that is, under a lower mold heating steam pressure. Further, in a case where an in-mold foaming molded product is prepared with use of, for example, a mold having a complicated shape or a large mold, there is a risk that expanded particles are not fused well to each other in some parts during molding. If the mold heating steam pressure is increased in order to perform the fusing sufficiently in such parts, the in-mold foaming molded product tend to deform or shrink. Accordingly, it is desired that a range of mold heating steam pressure (which may be hereinafter referred to also as "range of heating conditions for molding") be wider than conventional.

A mainstream method for producing polypropylene resin expanded particles is a method of (i) dispersing polypropylene resin particles in water in a pressure-resistant vessel together with, for example, a dispersant in the presence of a foaming agent, (ii) heating the polypropylene resin particles under pressure to a predetermined foaming temperature, (iii) impregnating the polypropylene resin particles with the foaming agent, and then (iv) releasing the polypropylene resin particles to a low-pressure area for foaming.

Half-melting polypropylene resin particles in a pressure-resistant vessel at a foaming temperature, which is in the vicinity of a resin melting point, can produce expanded particles having two melting peaks during a differential scanning calorimeter (which may be hereinafter abbreviated to "DSC") measurement of the expanded particles. Consequently, in-mold moldability of non-crosslinked polypropylene resin expanded particles is improved. A change occurring at that stage in the foaming temperature in the pressure-resistant vessel changes a DSC ratio [proportion of a high-temperature peak heat quantity to the total fusing heat quantity; QH/(QH+QL)×100(%) described below] of expanded particles having two melting peaks. This has problematically made it difficult to produce expanded particles having stable moldability.

In order to solve the problem of a high mold heating steam pressure, there have been proposed, each as a resin which has a low melting point and which has rather high rigidity in consideration of its melting point, (i) a propylene.1-butene random copolymer or a propylene.ethylene.1-butene random ternary copolymer, each prepared with use of a Ziegler polymerization catalyst (see Patent Literatures 1 and 2) and (ii) a PP homopolymer or a propylene.ethylene random copolymer, each prepared with use of a metallocene polymerization catalyst.

However, a propylene random copolymer containing a 1-butene comonomer, which is prepared with use of a Ziegler polymerization catalyst, has a limit in lowering its melting point. Specifically, melting points of commercially available propylene random copolymers are approximately 130° C. at the lowest.

On the other hand, a propylene.ethylene random copolymer, which is prepared with use of a metallocene polymerization catalyst, can have a lower melting point, specifically 130° C. or lower.

In order to perform in-mold foaming molding at a low heating temperature, there have been proposed polypropylene resin expanded particles made of a polypropylene resin having a resin melting point of 115° C. to 135° C. and an Olsen flexural modulus of 500 MPa or higher (see Patent Literature 3).

The resin used in Patent Literature 3 is, however, prepared partially from a propylene.ethylene.1-butene random ternary copolymer and mainly from a propylene.ethylene random copolymer prepared with use of a metallocene polymerization catalyst. Melting points of the resin in Examples in the specification of Patent Literature 3 are in a range of 120° C. to 134° C. Thus, although the polypropylene resin used in Patent Literature 3 enables in-mold foaming molding at a low heating temperature, the polypropylene resin used in Patent Literature 3 should be improved in terms of a range of mold heating steam pressure allowing use of a high temperature.

As a technique for widening the range of mold heating steam pressure, there have been propose polypropylene resin pre-expanded particles made from a mixture of two kinds of polypropylene resins of which a temperature difference between respective resin melting points is not smaller than 15° C. and not larger than 30° C. (see Patent Literature 4).

However, Patent Literature 4 requires a mold heating temperature of not lower than 140° C., and thus does not allow molding to be performed at a low temperature.

There have also been proposed similar techniques. Specifically, there have been proposed, in order to increase an peak temperature difference between a melting peak on a higher temperature side and a melting peak on a lower temperature side on a DSC curve for polypropylene resin expanded particles, (i) annealing polypropylene resin particles in a pressure-resistant vessel, (ii) using a blend of two or more kinds of polypropylene resins having respective resin melting points that are not much different from one another, the blend having a large difference between its resin melting point and its melting ending temperature, and (iii) blending two or more kinds of polypropylene resins having respective resin melting points that are greatly different from one another (see Patent Literature 5).

Patent Literature 5, however, discloses a lowest mold heating pressure of 0.20 MPa(G) (about 135° C.), and thus does not allow molding to be performed at a very low temperature.

Further, there have been proposed polypropylene resin expanded particles having a crystal structure which indicate (i) a main endothermic peak that exhibits an endothermic peak heat quantity of 70% to 95% of the total peak heat quantity and that has an apex temperature of 100° C. to 140° C. and (ii) two or more endothermic peaks on the higher temperature side of the main endothermic peak on the first DSC curve obtained when the polypropylene resin expanded particles are heated from normal temperature to 200° C. at a heating rate of 2° C./min by heat flux differential scanning calorimetry (see Patent Literature 6).

The polypropylene resin used in Patent Literature 6 is made from a mixture of (i) a propylene.ethylene random copolymer having a low melting point and prepared with use of a metallocene polymerization catalyst and (ii) a resin having a high melting point such as a propylene homopolymer prepared with use of a Ziegler polymerization catalyst. Examples in the specification of Patent Literature 6 describe that a satisfactory in-mold foaming molded product can be prepared with a heating steam pressure lower than 0.2 MPa·G, which pressure is lower than those used to prepare conventional polypropylene resin expanded particles.

However, according to the technique of Patent Literature 6, two component resins have an excessively large melting point difference therebetween, and therefore the expanded particles are expected to have a disturbed cell structure and to likely have an open-cell foam.

CITATION LIST

Patent Literature

Patent Literature 1
Japanese Patent Application Publication, Tokukaihei, No. 1-242638 A
Patent Literature 2
Japanese Patent Application Publication, Tokukaihei, No. 7-258455 A
Patent Literature 3
PCT International Publication 2008/139833
Patent Literature 4
Japanese Patent Application Publication, Tokukai, No. 2006-96805 A
Patent Literature 5
PCT International Publication 2009/051035
Patent Literature 6
PCT International Publication 2009/001626

SUMMARY OF INVENTION

Technical Problem

One object of the present invention is to provide polypropylene resin expanded particles which (i) have only a small change in expanded particle DSC ratio, the change corresponding to a change in foaming temperature, (ii) allow production of an in-mold foaming molded product at a very low mold heating steam pressure, (iii) exhibit low distortion, low shrinkage, and a wide range of heating conditions for molding, even if the mold heating steam pressure is increased, (iv) indicate a satisfactory moldability even in a case where the expanded particles are molded with use of, for example, a mold having a complicated shape, a large mold, and (v) keep its properties such as compressive strength, without being impaired largely, in a case where the polypropylene resin expanded particles are used to prepare an in-mold foaming molded product.

Solution to Problem

The inventor of the present invention has conducted research diligently in order to attain the above object and, as a result, found that in a case where (i) a particular polypropylene resin is used as a base material resin and (ii) polypropylene resin expanded particles exhibiting a particular DSC property at a first temperature rise are used for in-mold foaming molding, it is possible to make a polypropylene resin in-mold foaming molded product (polypropylene resin in-mold-expanded molding) of expanded particles which (i) have only a small change in expanded particle DSC ratio, the change corresponding to a change in foaming temperature during foaming, (ii) allow in-mold foaming molding to be performed at a very low mold heating steam pressure, (iii) exhibit low distortion, low shrinkage, and a wide range of heating conditions for molding, even if the mold heating steam pressure is increased, (iv) indicate a satisfactory moldability even in a case where the expanded particles are molded with use of, for example, a mold having a complicated shape, a large mold, and (v) have only a small decrease in physical properties such as compressive strength. Thus the inventor achieved the present invention.

Specifically, the present invention is arranged as follows:

[1] Polypropylene resin expanded particles including:
a polypropylene resin as a base material resin,
the propylene resin having at least two melting peaks on a DSC curve for a second temperature rise measured at a heating rate of 10° C./min with use of a heat flux differential scanning calorimeter (DSC), the at least two melting peaks including (i) a lowest temperature melting peak of not lower than 100° C. and not higher than 130° C. and (ii) a highest temperature melting peak of not lower than 140° C. and not higher than 160° C.,
the propylene resin having a resin DSC ratio change rate of 0.5%/° C. to 3.0%/° C.,
the expanded particles having two melting peaks in a DSC measurement made at a first temperature rise at the heating rate of 10° C./min, the two melting peaks including, (i) on a lower temperature side, a melting peak temperature of not lower than 100° C. and not higher than 130° C. and, (ii) on a higher temperature side, a melting peak temperature of not lower than 140° C. and not higher than 160° C.

[2] The polypropylene resin expanded particles according to [1],
wherein:
the polypropylene resin includes a polypropylene random copolymer resin produced by polymerization involving use of a metallocene polymerization catalyst.

[3] The polypropylene resin expanded particles according to [2],
wherein:
the polypropylene resin includes (i) the polypropylene random copolymer resin produced by the polymerization involving use of a metallocene polymerization catalyst and (ii) a polypropylene homopolymer produced by polymerization involving use of a metallocene polymerization catalyst.

[4] The polypropylene resin expanded particles according to [2] or [3],
wherein:
the polypropylene resin is produced by a multi-stage polymerization involving use of a metallocene polymerization catalyst.

[5] The polypropylene resin expanded particles according to any one of [2] to [4],
wherein:
the metallocene polymerization catalyst includes a metallocene compound represented by Formula 1 below,

[Chem. 1]

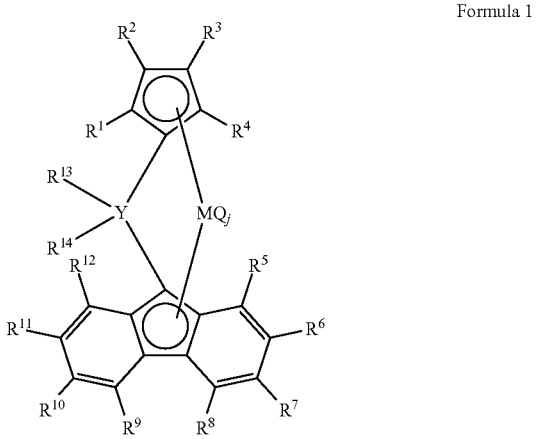

Formula 1 where $R^1, R^2, R^3, R^4, R^5, R^6, R^7, R^8, R^9, R^{10}, R^{11}, R^{12}, R^{13}$, and $R^{14}$ each identically or differently represent one selected from the group consisting of a hydrogen atom, a hydrocarbon group, and a silicon-containing group; M represents a group-4 transition metal; Y represents a carbon atom or a silicon atom; Q is selected from the group consisting of a halogen, a hydrocarbon group, an anion ligand, and a neutral ligand coordinatable with a lone pair of electrons either the same or different; and j represents an integer of 1 to 4.

[6] A polypropylene resin in-mold foaming molded product produced by in-mold foaming molding of polypropylene resin expanded particles according to any one of [1] to [5].

Advantageous Effects of Invention

Polypropylene resin expanded particles of the present invention (i) have only a small change in expanded particle DSC ratio, the change corresponding to a change in foaming temperature, (ii) allow production of a polypropylene resin in-mold foaming molded product at a very low mold heating steam pressure, (iii) exhibit low distortion, low shrinkage, and a wide range of heating conditions for molding, even if the mold heating steam pressure is increased, (iv) indicate a satisfactory moldability even in a case where the expanded particles are molded with use of, for example, a mold having a complicated shape, a large mold, and (v) keep its properties such as compressive strength, without being impaired largely, in a case where the polypropylene resin expanded particles are used to prepare an in-mold foaming molded product.

BRIEF DESCRIPTION OF DRAWINGS

FIG. 1 further illustrates an expanded particle DSC ratio change rate of Example 1 for reference.

DESCRIPTION OF EMBODIMENTS

Figure 1:
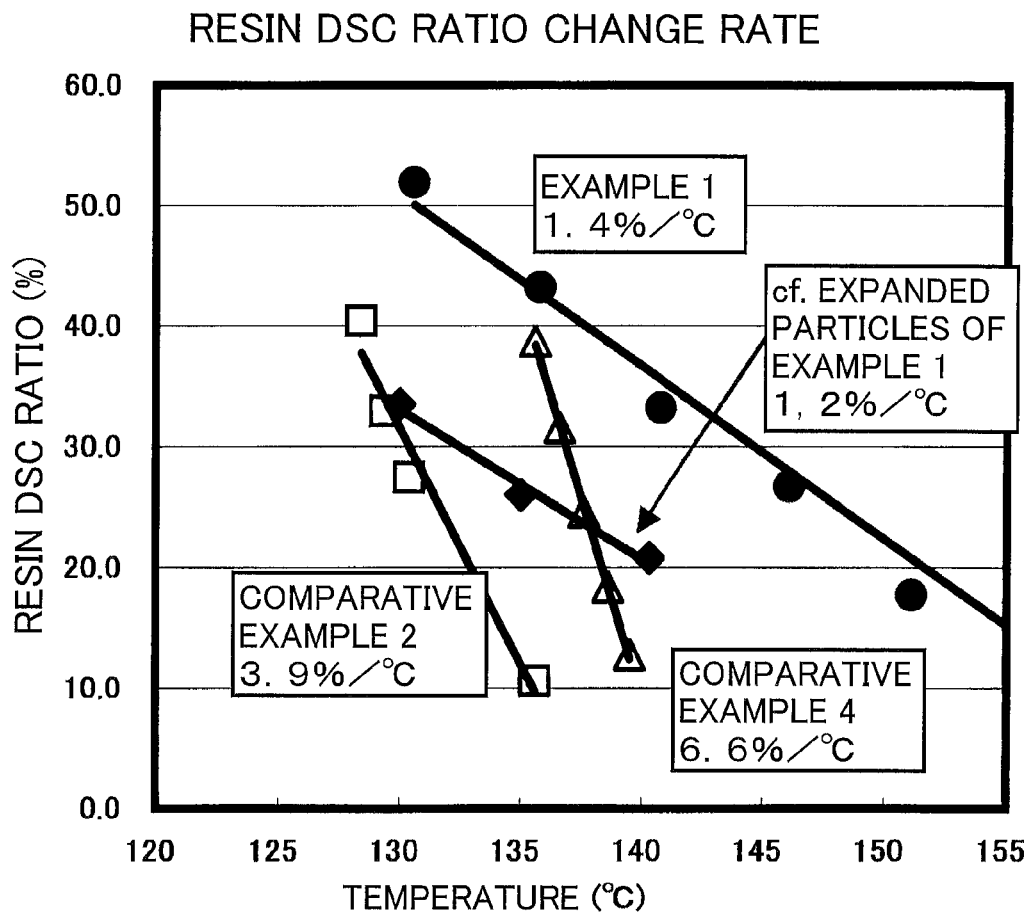
FIG. 1 is a graph illustrating respective resin DSC ratio change rates of polypropylene resins of Example 1 and Comparative Examples 2 and 4 in accordance with the present invention.
Figure 2:
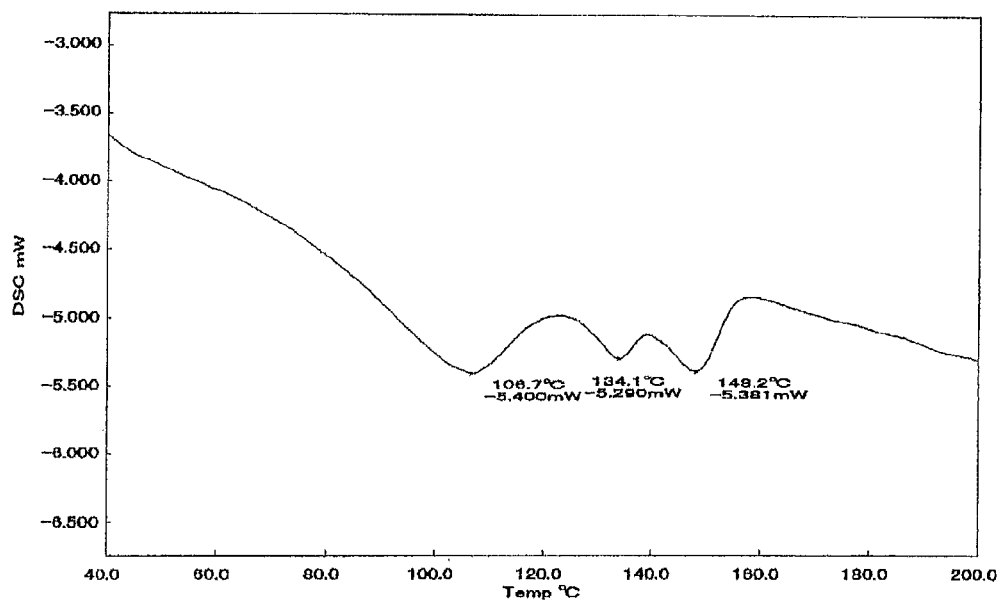
FIG. 2 is a graph illustrating a DSC curve in a DSC melting point measurement for the polypropylene resin of Example 1 in accordance with the present invention.

In the present invention, (i) a DSC melting point of a raw material resin, (ii) a DSC ratio change rate of a raw material resin, and (iii) an expanded particle DSC ratio are determined by methods below.

<Measurement of DSC Melting Point of Raw Material Resin>

A DSC melting point is measured with use of a heat flux differential scanning calorimeter [Model DSC6200, available from Seiko Instruments Inc.]. The DSC melting point is set as a temperature at a melting peak in a second temperature rise on a DSC curve obtained by (i) raising a temperature of 4 mg to 6 mg of polypropylene resin particles from 40° C. to 210° C. at a heating rate of 10° C./min, (ii) lowering the temperature from 210° C. to 40° C. at a cooling rate of 10° C./min, and then (iii) raising the temperature from 40° C. to 210° C. at a heating rate of 10° C./min.

In a case where the DSC curve has a plurality of melting peaks, the polypropylene resin particles have a plurality of melting points.

<How to Determine DSC Ratio Change Rate of Raw Material Resin>

(1) First, a temperature that is 5° C. to 10° C. higher than the DSC melting point of a polypropylene resin (in a case where there are a plurality of melting peaks, a temperature in the vicinity of a center of all peaks) is tentatively set as a heat treatment temperature A (° C.).

With use of a heat flux differential scanning calorimeter (DSC) [Model DSC6200, available from Seiko Instruments Inc.], the temperature of 4 mg to 6 mg of the polypropylene resin particles is (i) raised from 40° C. to 50° C. at a heating rate of 5° C./min, from 50° C. to (A-10)° C. at a heating rate of 3° C./min, and from (A-10)° C. to A° C. at a heating rate of 0.5° C./min, (ii) kept at A° C. for 30 minutes, (iii) lowered from A° C. to 40° C. at a cooling rate of 35° C./min, and then (iv) raised from 40° C. to 210° C. at a heating rate of 10° C./min, to obtain a DSC curve having two melting peaks.

From the DSC curve obtained as above, a ratio [=QH/(QH+QL)×100 (%)] (hereinafter referred to as "resin DSC ratio") of a quantity of heat at a melting peak on a higher temperature side is calculated. In other words, a DSC ratio can be calculated from (i) a melting peak heat quantity QL on the lower temperature side, the heat quantity QL being represented by an area enclosed by (a) a melting peak on the lower temperature side and (b) a tangent that extends from a maximum point between the lower temperature side peak and the higher temperature side peak to a baseline from which melting starts and (ii) a melting peak heat quantity QH on the higher temperature side, the heat quantity QH being represented by an area enclosed by (a) a melting peak on the higher temperature side and (b) a tangent that extends from a maximum point between the higher temperature side peak and the lower temperature side peak on the DSC curve to a baseline at which the melting ends.

(2) Similarly, the heat treatment temperature A (° C.) is changed so that the DSC ratio has a value which falls within a range of approximately 10% to 50%, and measurements are made at four to six points.

(3) Values at the respective four to six points are plotted in a graph with the X axis indicative of the heat treatment temperature A (° C.) and the Y axis indicative of the resin DSC ratio (%) as illustrated in FIG. 1, and a correlation straight line is drawn by collinear approximation.

A rate (%/° C.) of change per degree centigrade in resin DSC ratio of a raw material resin is determined as a gradient of the correlation straight line obtained as above.

The resin DSC ratio change rate obtained by the above measurement method substantially corresponds to an expanded particle DSC ratio change rate of actual expanded particles. For instance, in Example 1, resin is plasticized with a foaming agent in actual foaming as illustrated in FIG. 1, so that the same DSC ratio is obtained at a lower temperature. A DSC ratio change occurring as a result of a temperature change is nearly equal to a resin DSC ratio change rate.

The above indicates that a small change rate in resin DSC ratio results in a small change in expanded particle DSC ratio, the change occurring as a result of a change in foaming temperature.

<How to Determine DSC Ratio of Expanded Particles>

With use of a heat flux differential scanning calorimeter [Model DSC6200, available from Seiko Instruments Inc.], a DSC curve obtained when the temperature of 4 mg to 6 mg of the polypropylene resin expanded particles is raised from 40° C. to 210° C. at a heating rate of 10° C./min is obtained.

From the DSC curve obtained when the temperature is raised for the first time, a ratio [=QH/(QH+QL)×100(%)] (expanded particle DSC ratio) of a quantity of heat at a melting peak on a higher temperature side is calculated in a manner similar to the above.

In the present invention, a polypropylene resin used as a base material resin for polypropylene resin expanded particles is a resin including, as a main component, a propylene monomer.

Examples of the polypropylene resin encompass, in terms of composition, a copolymer including α-olefin such as ethylene, 1-butene, and pentene (for example, propylene.ethylene random copolymer, propylene.1-butene random copolymer, propylene.ethylene.1-butene random terpolymer, a mixture of the above copolymers, and a mixture of the above copolymers with a polypropylene homopolymer).

In the present invention, a polypropylene resin used as a base material resin for polypropylene resin expanded particles is, from a viewpoint of a low mold heating steam pressure, preferably a resin that is high in content of a copolymerizable component such as ethylene and 1-butene and that has a low melting point.

In a case where a copolymerizable component to be copolymerized with propylene is ethylene, the copolymer has an ethylene content rate of preferably not smaller than 3.0% by weight and not greater than 8.0% by weight, or more preferably not smaller than 3.5% by weight and not greater than 7.0% by weight.

In a case where a Ziegler polymerization catalyst is used as a polymerization catalyst, a copolymer that can be produced has an ethylene content rate having an upper limit of approximately 5% by weight. In a case where a metallocene polymerization catalyst is used, it is possible to produce a copolymer having an ethylene content rate of up to approximately 8% by weight.

The ethylene content of the polypropylene resin can be measured through carbon nuclear magnetic resonance spectrometry ($C^{13}$-NMR) by a method described in the specification of Japanese Patent Application Publication, Tokukai, No. 2009-84377 A.

Examples of the polypropylene resin used in the present invention encompass (i) a polypropylene resin produced by polymerization involving use of a metallocene polymerization catalyst and (ii) a polypropylene resin produced by polymerization involving use of a Ziegler polymerization catalyst. Among the examples, a polypropylene resin produced by polymerization involving use of a metallocene polymerization catalyst is preferable because it can have a low melting point.

Conventional polypropylene resins produced by polymerization involving use of a Ziegler polymerization catalyst have a limit in lowering the melting point, and a lower melting point for commercially available products is limited to approximately 130° C. On the contrary, the polypropylene resin prepared with use of a metallocene polymerization catalyst can be prepared at a lower melting point of not higher than 130° C. or even at not higher than 120° C. This low melting point is as low as a melting point of a polyethylene resin.

Among propylene resins prepared with use of a metallocene polymerization catalyst, a propylene-ethylene random copolymer is preferably used in particular in view of its versatility.

To produce expanded particles that have only a small change in expanded particle DSC ratio, that allows production of a molded product having stable quality, and that have a wide range of heating conditions for molding, the present invention preferably (i) uses, as a base material resin, a polypropylene resin that only has a small change in amount of fused crystal, the change occurring as a result of a temperature change, and (ii) produces expanded particles that have a large difference between two DSC peak temperatures in expanded particle DSC.

Specifically, the present invention preferably (i) uses, as a base material resin, a polypropylene resin that has a small resin DSC ratio change rate calculated by the above measurement method with use of a heat flux differential scanning calorimeter (DSC) for a polypropylene resin expanded resin and (ii) produces expanded particles that, in a DSC measurement made when the temperature of the expanded particles is raised for the first time, have two melting peaks and have, on the lower temperature side, a low melting peak temperature of not lower than 100° C. and not higher than 130° C.

The raw material polypropylene resin used in the present invention preferably has a resin DSC ratio change rate, calculated by the above measurement method with use of a heat flux differential scanning calorimeter (DSC), that falls within a range of 0.5%/° C. to 3.0%/° C.

If the raw material polypropylene resin has a resin DSC ratio change rate of smaller than 0.5%/° C., even a large change in foaming temperature will result in only an extremely small DSC ratio change. This tends to make it difficult to achieve a desired expanded particle DSC ratio by adjusting the foaming temperature. If the raw material polypropylene resin has a resin DSC ratio change rate of larger than 3.0%/° C., there tends to occur a large change in expanded particle DSC ratio, the change corresponding to a change occurring in foaming temperature during foaming.

A polypropylene resin having a resin DSC ratio change rate within the range of 0.5%/° C. to 3.0%/° C. is prepared in the present invention by a method of, for example, (i) mixing, with use of an extruder, a kneader, a Banbury mixer, a roller or the like, (a) a polypropylene resin having a low melting point with (b) a polypropylene resin having a high melting point each in a melted state or (ii) mixing, by a multi-stage polymerization, (a) a polypropylene resin having a low melting point with (b) a polypropylene resin having a high melting point at the time of polymerizing polypropylene.

It is preferable to use a polypropylene resin obtained by a multi-stage polymerization because particles of the polypropylene resin are mixed well with each other. Further, expanded resin particles produced as above tend to have uniform cell diameters. Also in consideration of this, it is preferable to use a polypropylene resin obtained by multi-stage polymerization through the above mixture performed at the time of polymerizing polypropylene.

The raw material polypropylene resin used in the present invention is preferably a polypropylene resin that has at least two melting peaks in a DSC melting point measurement made at the time of a second temperature rise, the at least two melting peaks including (i) a lowest temperature melting peak of not lower than 100° C. and not higher than 130° C. and (ii) a highest temperature melting peak of not lower than 140° C. and not higher than 160° C.

The lower the temperature of a melting point of a component contributing to the lowest temperature melting peak in resin DSC at a time of a second temperature rise, the lower the molding temperature can be. It is, however, currently difficult to produce a polypropylene resin in which the component contributing to the lowest temperature melting peak has a melting point of lower than 100° C.

If the component contributing to the lowest temperature melting peak has a melting point of higher than 130° C., the molding temperature tends to be higher.

In the present invention, the component contributing to the lowest temperature melting peak of not lower than 100° C. and not higher than 130° C. in resin DSC at the time of a second temperature rise is typically difficult to produce with use of a normal Ziegler catalyst, and is preferably derived from a polypropylene resin produced by polymerization involving use of a metallocene polymerization catalyst.

If the component contributing to the highest temperature melting peak in resin DSC at the time of a second temperature rise has a melting point of lower than 140° C., the temperature difference between the low melting point component and the high melting point component will be small. This tends to cause a resin DSC ratio change rate to be excessively large. If the component contributing to the highest temperature melting peak has a melting point of higher than 160° C., expanded particles as foamed tend to have a disturbed cell structure to have an open-cell foam.

As to the resin DSC at the time of a second temperature rise, the higher the melting point of the component contributing to the highest temperature melting peak or the higher the ratio of the component, the higher the foaming temperature and the molding temperature tend to be.

Thus, if there is a large melting point difference between the component contributing to the lowest temperature melting peak and the component contributing to the highest temperature melting peak, or if the component contributing to the highest temperature melting peak has an excessively higher ratio, (i) the foaming temperature will be on the higher temperature side, which tends to totally fuse crystal in the low melting point component, or (ii) the melting viscosity will be excessively low, which tends to (a) cause expanded particles produced to have an ununiform cell structure and/or to (b) generate an open-cell foam.

The component contributing to the highest temperature melting peak of not lower than 140° C. and not higher than 160° C. in resin DSC at the time of a second temperature rise is (i) a polypropylene homopolymer obtained by polymerization involving use of a metallocene polymerization catalyst or (ii) selected from polypropylene resins such as (a) a propylene random copolymer obtained by polymerization involving use of a metallocene polymerization catalyst and (b) a propylene random copolymer obtained by polymerization involving use of a Ziegler polymerization catalyst.

The component contributing to the highest temperature melting peak of not lower than 140° C. and not higher than 160° C. in resin DSC at the time of a second temperature rise is preferably (i) derived from a polypropylene resin obtained by polymerization involving use of a metallocene polymerization catalyst, or more preferably (ii) derived from a polypropylene homopolymer obtained by polymerization involving use of a metallocene polymerization catalyst since such a component has a higher resin rigidity for the same melting point, compared with ones derived from other resins.

The present invention is most preferable in a case where (i) the component contributing to the lowest temperature melting peak is derived from a polypropylene random copolymer resin that is produced by polymerization involving use of a metallocene polymerization catalyst and that has a resin melting point of not lower than 100° C. and not higher than 130° C. and (ii) the component contributing to the highest temperature melting peak is derived from a polypropylene homopolymer that is produced by polymerization involving use of a metallocene polymerization catalyst and that has a resin melting point of not lower than 140° C. and not higher than 160° C. In such a case, expanded particles obtained (i) have a uniform cell structure and only a small amount of an open-cell foam, (ii) have a very low molding temperature, and (iii) have high resin rigidity, thus allowing production of a foamed product having high compressive strength.

In the present invention, the raw material polypropylene resin preferably includes the low melting point component, contributing to the lowest temperature melting peak in resin DSC at the time of a second temperature rise, at a ratio of not smaller than 60% by weight and not larger than 95% by weight.

If the amount of the low melting point component contributing to the lowest temperature melting peak is smaller than 60% by weight, expanded particles to be obtained tend to have a high molding temperature. If the amount is larger than 95% by weight, the component contributing to the melting peak on the higher temperature side will be excessively small in amount, which tends to increase the resin DSC ratio change rate.

In a case where a polypropylene resin prepared with use of a metallocene catalyst, the polypropylene resin being used in the present invention, is available from a multi-stage polymerization, the production includes steps of preliminary polymerization (P-1), prepolymerization (P-2), and polymerization (P-3). It is preferable that these steps be carried out sequentially in the presence of a metallocene polymerization catalyst.

Preliminary polymerization step (P-1): A step of producing a preliminary polymer by polymerizing ethylene. By adding a small amount of an ethylene preliminary polymer, the polymerization catalyst can be stabilized.

Prepolymerization step (P-2): A step of producing a prepolymer by polymerizing propylene in the presence of the preliminary polymer.

Polymerization step (P-3): A step of producing a propylene copolymer by copolymerizing, in the presence of the prepolymer, (i) propylene and (ii) ethylene and/or a C4 or greater α-olefin.

The metallocene polymerization catalyst used in the present invention is preferably a metallocene polymerization catalyst containing a metallocene compound represented by Formula 1 below.

[Chem. 2]

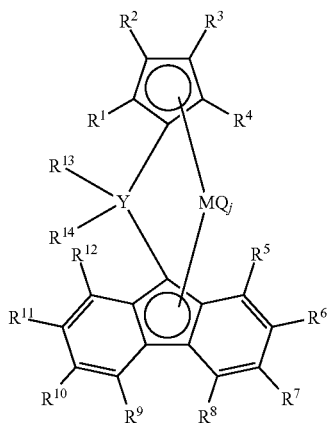

Formula 1 where $R^1$, $R^2$, $R^3$, $R^4$, $R^5$, $R^6$, $R^7$, $R^8$, $R^9$, $R^{10}$, $R^{11}$, $R^{12}$, $R^{13}$, and $R^{14}$ each identically or differently represent one selected from the group consisting of a hydrogen atom, a hydrocarbon group, and a silicon-containing group; M represents a group-4 transition metal; Y represents a carbon atom or a silicon atom; Q is selected from the group consisting of a halogen, a hydrocarbon group, an anion ligand, and a neutral ligand coordinatable with a lone pair of electrons either the same or different; and j represents an integer of 1 to 4.

The present invention uses the above metallocene polymerization catalyst to reduce the amount of hetero-bonding of 2,1-insertion and 1,3-insertion to not larger than 0.2 mol % in total.

The melt flow rate (hereinafter abbreviated to "MFR") of the polypropylene resin used in the present invention is preferably (i) not lower than 2 g/10 min and not higher than 50 g/10 min, or more preferably (ii) not lower than 5 g/10 min and not higher than 40 g/10 min.

If the MFR of the polypropylene resin is lower than 2 g/10 min, the foamability will tend to decrease. If the MFR of the polypropylene resin is higher than 50 g/10 min, cells of the polypropylene resin expanded particles will be destroyed, so that the polypropylene resin will tend to generate an open-cell foam.

The MFR is measured, with use of an MFR measuring instrument described in JIS-K 7210, under conditions involving (i) an orifice having a diameter of 2.0959±0.005 mm and a length of 8.000±0.025 mm, (ii) a load of 2160 g, and (iii) a temperature of 230±0.2° C.

The polypropylene resin produced by polymerization involving use of a metallocene polymerization catalyst tends to have (i) a small molecular weight distribution and (ii) a small amount of a low molecular weight component having a plasticizing action.

Thus, to achieve satisfactory foamability, a polypropylene resin in the present invention which polypropylene resin is produced by polymerization involving use of a metallocene polymerization catalyst preferably has an MFR that is higher than that of a polypropylene resin produced by polymerization involving use of a Ziegler polymerization catalyst.

It is possible to mix, with the polypropylene resin used in the present invention, another thermoplastic resin that can be used together with the polypropylene resin, as long as such a thermoplastic resin does not impair properties of the polypropylene resin. Such thermoplastic resins are, for example, low-density polyethylene, linear low-density polyethylene, polystyrene, polybutene, and ionomer.

In the present invention, to produce expanded particles easily, it is preferable that the polypropylene resin be generally, in advance, (i) melted with use of an extruder, a kneader, a Banbury mixer, a roller or the like and (ii) processed to be particles each having a desired shape such as a cylinder, an ellipse, a sphere, a cube, and a rectangular parallelepiped.

The polypropylene resin particles of the present invention are processed to have a size such that each particle has a weight in a range of preferably 0.1 mg to 30 mg, or more preferably 0.3 mg to 10 mg.

The weight of each of the polypropylene resin particles refers to an average resin particle weight found by (i) picking up 100 resin particles from the polypropylene resin particles in a random manner, (ii) weighing the 100 resin particles, and (iii) taking an average of respective weights of the resin particles.

In a case where hydrocarbon foaming agents such as propane, normal butane, isobutane, normal pentane, isopentane, and hexane are used as a foaming agent, it is preferable to add, to the polypropylene resin particles used in the present invention, an inorganic substance, which is to be a cell nucleating agent such as talc, silica, and calcium carbonate, in an amount of not smaller than 0.005 part by weight and not larger than 0.5 part by weight with respect to 100 parts by weight of the polypropylene resin.

In a case where an inorganic foaming agent such as air, nitrogen, carbon dioxide gas, and water is to be used together with the polypropylene resin particle used in the present invention, it is preferable to add the above inorganic nucleating agent and/or a water absorbing substance.

The water absorbing substance for the present invention is a substance that allows the polypropylene resin particles to contain water in a case where the substance has been added to the polypropylene resin particles so that (i) the polypropylene resin particles are in contact with water or (ii) the polypropylene resin particles are impregnated with a foaming agent in an aqueous dispersion system.

Specific examples of the water absorbing substance used in the present invention encompass: water-soluble inorganic substances such as sodium chloride, calcium chloride, magnesium chloride, sodium borate, and zinc borate; hydrophilic polymers such as polyethylene glycol, a special block polymer containing polyether as a hydrophilic segment [trade name: PELESTAT, available from Sanyo Chemical Industries, Ltd.], an alkali metal salt of an ethylene (meth)acrylic acid copolymer, an alkali metal salt of a butadiene(meth) acrylic acid copolymer, an alkali metal salt of a carboxylated nitrile rubber, an alkali metal salt of an isobutylene-maleic anhydride copolymer, and an alkali metal salt of a poly(meth) acrylic acid; polyalcohols such as ethylene glycol, glycerol, pentaerythritol, and isocyanuric acid; and melamine.

These water-soluble inorganic substances, hydrophilic polymers, polyalcohols and the like can be used alone, or two or more of them can be used in combination.

The additive amount of the water absorbing substance for the present invention differs depending on a foaming ratio to be intended, a foaming agent to be used, and the kind of water absorbing substance to be used. The additive amount thus cannot be determined generally.

However, in a case where a water-soluble inorganic substance or polyalcohol is used, the amount of the water-soluble inorganic substance or polyalcohol is preferably not smaller than 0.01 part by weight and not larger than 2 parts by weight with respect to 100 parts by weight of the polypropylene resin. In a case where a hydrophilic polymer is used, the amount of the hydrophilic polymer is preferably not smaller than 0.05 part by weight and not larger than 5 parts by weight with respect to 100 parts by weight of the polypropylene resin.

In the present invention, an additive can be added to the polypropylene resin according to need. Examples of the additive encompass antistatic agents, pigments, flame resistance improving agents, and conductivity improving agents. Generally in this case, the additive is preferably added to molten resin during production of the resin particles.

A method for producing polypropylene resin expanded particles is not particularly limited. However, the following example method is preferable: in a pressure-resistant vessel, polypropylene resin particles are dispersed into water, together with a dispersant etc., in the presence of a foaming agent; the polypropylene resin particles are heated to a predetermined foaming temperature under pressure, and in addition, the foaming agent is impregnated to the resin particles; and after that, a dispersion substance including the polypropylene resin particles in the pressure-resistant vessel is released and foamed to a low pressure area while a temperature and a pressure in the pressure-resistant vessel are kept constant (this method may be referred to herein as "one-stage foaming process" in comparison to "two-stage foaming process" described below).

The pressure-resistant vessel has, when the dispersion substance is released from inside the pressure-resistant vessel to a low-pressure area, an inside foaming temperature that is preferably between (intermediate temperature −15)° C. and (intermediate temperature +15)° C. with reference to, as a standard, a temperature [=(melting peak temperature on the lower temperature side+melting peak temperature on the higher temperature side)/2(° C.); hereinafter referred to as "intermediate temperature")] of the raw material polypropylene resin which temperature is between a melting peak temperature on the lower temperature side and a melting peak temperature on the higher temperature side in resin DSC at the time of a second temperature rise.

The present invention is arranged such that in a case where the kind and amount of the foaming agent are fixed, by adjusting the temperature inside the pressure-resistant vessel which temperature is achieved when the dispersion substance is released from inside the pressure-resistant vessel to a low-pressure area, the ratio [=QH/(QH+QL)×100(%)] (expanded particle DSC ratio) of a quantity of heat at a melting peak of the polypropylene resin expanded particles which melting peak is on the higher temperature side can be adjusted to not smaller than 10% and not larger than 50%.

Examples of the foaming agent impregnated to the polypropylene resin particles used in the present invention encompass: hydrocarbon foaming agents such as propane, normal butane, isobutane, normal pentane, isopentane, and hexane; and inorganic foaming agents such as air, nitrogen, carbon dioxide gas, and water. These foaming agents can be used alone, or two or more of the foaming agents can be used in combination.

Out of these foaming agents, it is preferable to use (i) carbon dioxide gas, (ii) water, or (iii) isobutane that attains a higher foaming ratio.

The usage amount of the foaming agent in the present invention differs depending on a resin to be used, a foaming agent to be used, and a desired foaming ratio. The foaming agent may, however, be used appropriately in accordance with a desired foaming ratio of the polypropylene resin expanded particles. In general, the usage amount of the foaming agent is preferably not smaller than 1 part by weight and not larger than 60 parts by weight with respect to 100 parts by weight of the polypropylene resin particles.

In the present invention, in a case where the foaming agent is an inorganic foaming agent such as air, nitrogen, carbon dioxide gas, and water, first-stage foaming may achieve only a relatively low foaming ratio.

In this case, to produce expanded particles having a higher foaming ratio, so-called "two-stage foaming process" may be used, which is a process of (i) temporarily producing polypropylene resin expanded particles by the above process (one-stage foaming process), (ii) impregnating the expanded particles with inert gas such as air to impart a foaming power thereto, and then (iii) heating the expanded particles to further foam the expanded particles.

The pressure-resistant vessel used for the production of the polypropylene resin expanded particles is not particularly limited to any specific one. Such a pressure-resistant vessel simply needs to resist a pressure and temperature in the vessel during the production of the polypropylene resin expanded particles, and is, for example, an autoclave-type pressure-resistant vessel.

Examples of the dispersant used in the present invention encompass inorganic dispersants such as tertiary calcium phosphate, tertiary magnesium phosphate, basic magnesium carbonate, calcium carbonate, basic zinc carbonate, aluminum oxide, iron oxide, titanium oxide, aluminosilicate, barium sulfate, and kaolin.

In the present invention, a dispersion auxiliary agent may be used together with the dispersant. Examples of the dispersion auxiliary agent to be used encompass surfactants such as sodium dodecylbenzenesulfonate, sodium n-paraffin sulfonate, and sodium alpha olefin sulfonate.

Out of these dispersion auxiliary agents, it is preferable to use a combination of (i) tertiary calcium phosphate as the dispersant and (ii) sodium n-paraffin sulfonate as the dispersion auxiliary agent.

The usage amount of the dispersant or the dispersion auxiliary agent differs depending on the kind of the dispersant or the dispersion auxiliary agent to be used, the kind of polypropylene resin to be used, and the usage amount of the polypropylene resin. In a case where an introducing ratio of the polypropylene resin particles and water is within the range of 1/3 to 1/1, it is preferable that (i) the dispersant be used in an amount of not smaller than 0.1 part by weight and not larger than 5 parts by weight with respect to the water of 100 parts by weight and (ii) the dispersion auxiliary agent be used in an amount of not smaller than 0.001 part by weight and not larger than 0.1 part by weight with respect to the water of 100 parts by weight. This is because (i) dispersion stability can be secured and (ii) the dispersant is less apt to adhere to surfaces of the expanded particles to be obtained, and therefore the dispersant does not prevent the expanded particles from fusing to each other when the in-mold foaming molded product is prepared.

The polypropylene resin expanded particles of the present invention preferably have at least two melting peaks on the DSC curve obtained in a measurement of a first temperature rise with use of a heat flux differential scanning calorimeter (DSC).

In the present invention, in order to achieve a wide range of heating conditions for molding, a difference between the melting peak temperature on the lower temperature side and the melting peak temperature on the higher temperature side, which difference appears on the DSC curve obtained at the first temperature rise for the expanded particles, is preferably (i) not smaller than 25° C. and not larger than 40° C., or more preferably (ii) not smaller than 30° C. and not larger than 40° C.

If the difference between the lowest melting peak temperature and the highest melting peak temperature on the DSC curve obtained at the first temperature rise for the polypropylene resin expanded particles is smaller than 25° C., the range of heating conditions for molding will tend to be insufficient to perform in-mold foaming molding with use of, for example, a mold having a complicated shape or a large mold.

If the base material resin is a polypropylene resin having a resin DSC ratio change rate of larger than 3%/° C., the resin DSC ratio change rate being determined with use of a heat flux differential scanning calorimeter (DSC), the difference will be smaller than 25° C. between the lowest melting peak temperature and the highest melting peak temperature on the DSC curve obtained at the first temperature rise for the polypropylene resin expanded particles.

If the difference is larger than 40° C. between the lowest melting peak temperature and the highest melting peak temperature on the DSC curve obtained at the first temperature rise for the polypropylene resin expanded particles, the foaming temperature will be raised excessively. Accordingly, the polypropylene resin expanded particles thus obtained will have an easily disturbed cell structure, and ununiform cells will be generated, so that the expanded particles will tend to generate an open-cell foam. In addition, the surfaces of the polypropylene resin in-mold foaming molded product will tend to be recessed, or the polypropylene resin in-mold foaming molded product will tend to shrink largely.

In a case where the base material resin includes, as a high melting point component, a polypropylene resin (for example, a polypropylene homopolymer produced by polymerization involving use of a Ziegler polymerization catalyst) having a melting point of higher than 160° C., the difference tends to be larger than 40° C. between the lowest melting peak temperature and the highest melting peak temperature on the DSC curve at the first temperature rise for the polypropylene resin expanded particles.

The polypropylene resin expanded particles of the present invention preferably have a ratio $[=QH/(QH+QL)\times100(\%)]$ (expanded particle DSC ratio) of not smaller than 10% and not larger than 50%, the ratio being of a quantity of heat at a high temperature melting peak and being calculated from a melting peak heat quantity QL on the lower temperature side and the melting peak heat quantity QH on the higher temperature side on the DSC curve obtained in a measurement of a first temperature rise with use of a heat flux differential scanning calorimeter.

If the DSC ratio of the expanded particles is smaller than 10%, the polypropylene resin expanded particles will tend to have a low rate of independent cells, so that the polypropylene resin in-mold foaming molded product will tend to have a large distortion rate. If the DSC ratio of the expanded particles is larger than 50%, the in-mold foaming molding of the polypropylene resin expanded particles will be unable to be performed with an enough secondary foaming power, thereby resulting in a polypropylene resin in-mold foaming molded product in which the expanded particles are not fused well to each other, that is, like awaokoshi (which is a cereal bar-like Japanese confectionery: i.e., a state in which the particles are fused to each other with gaps therebetween).

The polypropylene resin expanded particles of the present invention have an average cell diameter of preferably (i) not smaller than 30 μm and not larger than 1000 μm, more preferably (ii) not smaller than 50 μm and not larger than 500 μm, or most preferably (iii) not smaller than 100 μm and not larger than 350 μm.

If the average cell diameter of the polypropylene resin expanded particles is smaller than 30 μm, in a case where the polypropylene resin expanded particles have been used to prepare an in-mold foaming molded product, the in-mold foaming molded product will tend to shrink largely and have a surface that has decreased beautifulness. If the average cell diameter is larger than 1000 μm, (i) the cell diameters will tend to be ununiform, and (ii) the polypropylene resin expanded particles will tend to vary widely in foaming ratio.

The average cell diameter of the polypropylene resin expanded particles is a value obtained as follows: Ten of the expanded particles are sampled in a random manner. Each of the expanded particles is cut into two pieces with use of a double-edged razor carefully enough not to destroy a cell film. A cross-section of each piece is then observed under a microscope [microscope VHX-100, available from Keyence Corporation] at a magnification of 100. In an image obtained, cells that are present along a line extending in the middle of the piece and having a width of 2 mm (2000 μm) are counted, and the cell diameter (μm) is found by calculating 2000/the number of cells. The average cell diameter is calculated as a mean value of the respective cell diameters of the 10 expanded particles.

The polypropylene resin expanded particles of the present invention are for use in in-mold foaming molding to produce a polypropylene resin in-mold foaming molded product.

The in-mold foaming molding of the polypropylene resin expanded particles may be performed by, for example, any of the following conventionally known methods: (A) a method of using the expanded particles directly; (B) a method of injecting inorganic gas such as air into the expanded particles in advance to impart a foaming ability to the expanded particles; and (C) a method of compressing the expanded particles to increase an internal pressure thereof, introducing into a mold the expanded particles of which the internal pressure has been increased, and molding the expanded particles.

For example, in a case of (B), the polypropylene resin expanded particles are molded into a polypropylene resin in-mold foaming molded product through the steps of (i) pressurizing air inside a pressure-resistant vessel in advance, (ii) injecting air into the polypropylene resin expanded particles, (iii) adjusting an internal pressure of the expanded particles to approximately 0.12 MPa to 0.3 MPa to impart a foaming ability to the expanded particles, (iv) introducing the expanded particles, to which a foaming ability has been imparted, into a closable but not sealable mold, (v) molding the expanded particles with use of steam as a heating medium under a heating steam pressure of approximately 0.1 MPa·G to 0.4 MPa·G for approximately 3 seconds to 30 seconds, thereby fusing the polypropylene resin expanded particles to each other, and then (vi) water-cooling the mold to cool the in-mold foaming molded product to such an extent that the in-mold foaming molded product will not deform after the in-mold foaming molded product is removed from the mold.

The polypropylene resin in-mold foaming molded product in the present invention has a foaming ratio of preferably 3 times to 100 times, or more preferably 6 times to 60 times.

The foaming ratio of the polypropylene resin in-mold foaming molded product can be obtained from a dry weight (W: g) of the foaming molded product and an ethanol submergence volume (V: cm$^3$) thereof by the following expression:

(Foaming ratio of the foaming molded product)=1/(W/V)×0.9(which is a resin density of the polypropylene resin)

The polypropylene resin in-mold foaming molded product of the present invention has a density that is preferably (i) not lower than 9 g/L and not higher than 300 g/L, or more preferably (ii) not lower than 15 g/L and not higher than 150 g/L.

EXAMPLES

Hereinafter, the present invention will be described in detail in reference with Examples. Note, however, that the present invention is not limited to the Examples.

Measurements and evaluations in the Examples were carried out as described below.

<Method for Measuring Ethylene Content Rate of Polypropylene Resin>

The ethylene content rate of the polypropylene resin was measured through carbon nuclear magnetic resonance spectrometry ($C^{13}$-NMR) by a method described in paragraphs [0076] to [0079] of Japanese Patent Application Publication, Tokukai, No. 2009-84377 A.

<Method for Measuring Homo PP Content (Polypropylene Homopolymer Content)>

A homo PP content (polypropylene homopolymer content) was calculated from an area formed by a higher temperature side peak on a peak curve obtained by measuring a polypropylene resin by temperature rising elution fractionation (TREF).

Homo PP content=(area formed by the higher temperature side peak/total area)×100(%)

The measurement by temperature rising elution fractionation (TREF) was carried out with use of an apparatus below under measurement conditions below.

Specifically, a sample solution (o-dichlorobenzene solution of a polypropylene random copolymer resin) was injected into a sample solution injection section having a temperature of 135° C., and was then cooled at a TREF section from 135° C. to 0° C. at a cooling rate of 1° C./min. This crystallized the sample inside the TREF section. Next, the temperature of the TREF section was maintained at 0° C. for 60 minutes. The sample was then sequentially eluted at melting fraction temperatures below to be guided from the TREF section to a GPC column. After that, a GPC chromatogram (molecular weight distribution) of the sample was obtained with use of an infrared detector.

The GPC chromatogram obtained as above was processed with use of analysis software included in the apparatus. An integral curve (cumulative elution amount curve with respect to a melting temperature) was drawn on the basis of a peak area at each melting temperature, and the integral curve was differentiated. This allowed an elution curve to be drawn.

Apparatus: cross fractionation chromatograph CFC2 (available from Polymer ChAR)
Detector: infrared spectrophotometer IR4 model (available from Polymer ChAR)
Detection wavelength: 3.42 μm
GPC column: Shodex AT-806MS (available from Showa Denko K.K.)×3
Column temperature: 135° C.
Column calibration: monodisperse polystyrene (available from Tosoh Corporation)
Molecular weight calibration method: reduced to general calibration/polyethylene
Eluent: o-dichlorobenzene
Flow rate: 1.0 mL/min
Sample concentration: 60 mg/20 mL
Injection amount: 500 μL
Cooling period: 135 minutes (135→0° C.) at crystallization rate of 1° C./min, then maintained at 0° C. for 60 minutes, and then eluted at melting fraction temperatures: 0, 20, 40, 50, 60, 70, 75, 80, 83, 86, 89, 92, 95, 98, 101, 104, 106, 108, 110, 112, 114, 116, 118, 120, 122, 124, 126, 130, and 135° C. (29 fractionations)

<Measurement of DSC Melting Point of Raw Material Resin>

A DSC melting point is measured with use of a heat flux differential scanning calorimeter [Model DSC6200, available from Seiko Instruments Inc.]. The DSC melting point is set as a temperature at a melting peak in a second temperature rise on a DSC curve which is obtained by raising a temperature of polypropylene resin particles (4 mg to 6 mg) from 40° C. to 210° C. at a heating rate of 10° C./min, lowering the temperature from 210° C. to 40° C. at a cooling rate of 10° C./min, and then again raising the temperature from 40° C. to 210° C. at a heating rate of 10° C./min. In a case where a plurality of melting peaks appear, the polypropylene resin particles have a plurality of melting points.

<How to Determine DSC Ratio Change Rate of Raw Material Resin>

(1) First, a temperature that is 5° C. to 10° C. higher than the DSC melting point of a polypropylene resin (in a case where there are a plurality of melting peaks, a temperature in the vicinity of a center of all peaks) is tentatively set as a heat treatment temperature A (° C.).

With use of a heat flux differential scanning calorimeter (DSC) [Model DSC6200, available from Seiko Instruments Inc.], the temperature of 4 mg to 6 mg of the polypropylene resin particles is (i) raised from 40° C. to 50° C. at a heating rate of 5° C./min, from 50° C. to (A-10)° C. at a heating rate of 3° C./min, and from (A-10)° C. to A° C. at a heating rate of 0.5° C./min, (ii) kept at A° C. for 30 minutes, (iii) lowered from A° C. to 40° C. at a cooling rate of 35° C./min, and then (iv) raised from 40° C. to 210° C. at a heating rate of 10° C./min, to obtain a DSC curve having two melting peaks.

From the DSC curve obtained as above, a ratio [=QH/(QH+QL)×100(%)] (hereinafter referred to as "resin DSC ratio") of a quantity of heat at a melting peak on a higher temperature side is calculated. In other words, a DSC ratio can be calculated from (i) a melting peak heat quantity QL on the lower temperature side, the heat quantity QL being represented by an area enclosed by (a) a melting peak on the lower temperature side and (b) a tangent that extends from a maximum point between the lower temperature side peak and the higher temperature side peak to a baseline from which melting starts and (ii) a melting peak heat quantity QH on the higher temperature side, the heat quantity QH being represented by an area enclosed by (a) a melting peak on the higher temperature side and (b) a tangent that extends from a maximum point between the higher temperature side peak and the lower temperature side peak on the DSC curve to a baseline at which the melting ends.

(2) Similarly, the heat treatment temperature A (° C.) is changed so that the DSC ratio has a value which falls within a range of approximately 10% to 50%, and measurements are made at four to six points.

(3) Values at the respective four to six points are plotted in a graph with the X axis indicative of the heat treatment temperature A (° C.) and the Y axis indicative of the resin DSC ratio (%) as illustrated in FIG. 1, and a correlation straight line is drawn by collinear approximation.

A rate (%/° C.) of change per degree centigrade in resin DSC ratio of a raw material resin is determined as a gradient of the correlation straight line obtained as above.

<How to Determine DSC Ratio of Polypropylene Resin Expanded Particles>

With use of a heat flux differential scanning calorimeter [Model DSC6200, available from Seiko Instruments Inc.], a DSC curve obtained when the temperature of 4 mg to 6 mg of the polypropylene resin expanded particles is raised from 40° C. to 210° C. at a heating rate of 10° C./min is obtained.

From the DSC curve obtained, a ratio [=(QH/(QH+QL)×100(%)] (expanded particle DSC ratio) of a quantity of heat at a melting peak on a higher temperature side is calculated in a manner similar to the above.

<Foaming Ratio of Polypropylene Resin Expanded Particles>

A weight w (g) and an ethanol submergence volume V (cm$^3$) of the polypropylene resin expanded particles having a bulk volume of approximately 50 cm$^3$ were determined. Then, a foaming ratio was calculated by the expression below from a density d (g/cm$^3$) of polypropylene resin particles that had not yet been foamed.

Foaming ratio=$d \times V/W$

<Average Cell Diameter of Polypropylene Resin Expanded Particles>

Ten of the expanded particles obtained were sampled in a random manner. Each of the expanded particles was cut into two pieces with use of a double-edged razor carefully enough not to destroy a cell film. Then, a cross-section of each piece was observed under a microscope [microscope VHX-100, available from Keyence Corporation] at a magnification of 100. In an image obtained, cells that are present along a line extending in the middle of the piece and having a width of 2 mm (2000 μm) were counted, and the cell diameter (μm) of each expanded particle was found by calculating 2000/the number of cells. The average cell diameter was obtained by calculating a mean value of the respective cell diameters found of the 10 expanded particles.

<Density of Polypropylene Resin In-Mold Foaming Molded Product>

The density of the polypropylene resin in-mold foaming molded product was calculated by the expression below from a dry weight (W: g) and ethanol submergence volume (V: cm3) of the in-mold foaming molded product:

Density of the in-mold foaming molded product (g/L)=$(W/V) \times 1000$

<Compression Strength of Polypropylene Resin In-Mold Foaming Molded Product by 50% Compression>

A test piece having a length of 50 mm, a width of 50 mm, and a thickness of 25 mm was cut out from the polypropylene resin in-mold foaming molded product. The test piece thus cut out was compressed at a rate of 10 mm/min in accordance with NDZ-Z0504, and a compressive stress (MPa) of the in-mold foaming molded product obtained when the in-mold foaming molded product was compressed by 50% was measured. The compressive stress was evaluated with respect to the following references:

G (good): The compressive strength obtained when the in-mold foaming molded product was compressed by 50% was 0.12 MPa or greater at the foaming molded product density of 20 g/L.

P (poor): The compressive strength obtained when the in-mold foaming molded product was compressed by 50% was smaller than 0.12 MPa at the foaming molded product density of 20 g/L.

<Evaluation of Molded Product>

For evaluation of molded products, in-mold foaming molding was performed under mold heating steam pressures within the range of 0.09 MPa to 0.30 MPa (gauge pressure) with use of (i) a polyolefin foam molding machine [KD-345, available from DAISEN Co., Ltd.,] and (ii) a mold having a length of 400 mm, a width of 300 mm, and a thickness of 50 mm.

The polypropylene resin in-mold foaming molded product obtained was (i) let stand for 1 hour at a room temperature, (ii) dried and cured for 15 hours in a temperature-controlled room at 75° C., and (iii) taken out and let stand for 4 hours at a room temperature again. Then, (1) fusion between the expanded particles, (2) surface property of the in-mold foaming molded product, (3) a dimensional shrinkage rate thereof, and (4) a distortion rate thereof were evaluated, and a range of heating conditions for molding was evaluated.

Specifically, the lowest and highest mold heating steam pressures (of the polypropylene resin in-mold foaming molded product prepared while the mold heating steam pressure was changed) to pass all of the evaluation items (1) to (4) above (namely, the fusion, the surface property, the dimensional shrinkage rate, and the distortion rate) were determined, and a difference between the lowest and highest mold heating steam pressures was set to be a "range of heating conditions for molding", which was evaluated by the following references:

G (good): The range of heating conditions for molding of not smaller than 0.1 MPa F (fair): The range of heating conditions for molding of not smaller than 0.05 MPa and smaller than 0.1 MPa P (poor): The range of heating conditions for molding of smaller than 0.05 MPa.

(1) Evaluation of Fusion

The polypropylene resin in-mold foaming molded product obtained was notched with use of a utility knife in a depth of approximately 5 mm to 10 mm along a thickness direction of the in-mold foaming molded product, and was then cleaved apart along the notch by hand. A cleaved surface of the cleaved in-mold foaming molded product was observed to find out how much particles were cleaved to lose their particle surfaces on the cleaved surface of the cleaved in-mold foaming molded product. Based on the proportion, the fusion was evaluated by the following references:

Pass: The rate of fusion of not smaller than 60%
Failure: The rate of fusion of smaller than 60%

(2) Evaluation of Surface Property

The surface state of the in-mold foaming molded product was observed visually, and the surface property was evaluated by the following references:

Pass: Good appearance with few gaps between particles, without many wrinkles
Failure: Poor appearance with many gaps between particles, with wrinkles (3) Dimensional Shrinkage Rate A longitudinal dimension (upper side section in a longitudinal direction) of the polypropylene resin foaming molded product obtained was measured, and the dimensional shrinkage rate of the in-mold foaming molded product with respect to a longitudinal dimension of the mold (400 mm) was calculated. Then, the dimensional shrinkage rate was determined as follows:

Pass: The shrinkage rate with respect to the longitudinal dimension was lower than 5%.
Failure: The shrinkage rate with respect to the longitudinal dimension was not lower than 5%.

(4) Distortion Rate

A thickness (average value of respective thicknesses of (i) a center part in a longitudinal direction, (ii) a part positioned 30 mm from a right side, and a part positioned 30 mm from a left side) of the polypropylene resin foaming molded product obtained was measured. Then, the distortion rate with respect to a thickness dimension (50 mm) of the mold was calculated, and determined as follows:

Pass: The distortion rate with respect to the thickness direction was lower than 7%.
Failure: The distortion rate with respect to a thickness direction was not lower than 7%.

Example 1

[Producing Propylene.Ethylene Random Copolymer with Use of Metallocene Polymerization Catalyst]

(1) Production of Solid Catalyst Carrier

First, 300 g of $SiO_2$ [available from Dohkai Chemical Industries Co., Ltd.] was weighed into a 1-L side-arm flask, and slurred with 800 mL of toluene added into the flask. Then, this slurry was transferred into a 5-L four-necked flask, and 260 mL of toluene was added into the slurry. Further, 2830 mL of methylaluminoxane (hereinafter, abbreviated to "MAO") toluene solution (solution of 10% by weight, available from ALBEMARLE CORPORATION) was introduced into the flask, and the mixture thus obtained was agitated for 30 minutes under room temperature. A temperature in the flask was gradually raised to 110° C. over 1 hour, and the mixture was agitated at 110° C. for 4 hours. After this agitation, the mixture was cooled to a room temperature. After the cooling, a supernatant toluene was removed from the mixture, and fresh toluene was supplied to the mixture in replacement of the removed supernatant toluene. This toluene replacement was repeated until a replacement ratio became 95%.

(2) Production of Solid Catalyst Component (Preparation of Metal Catalyst Component Carrier)

First, 2.0 g of diphenylmethylene(3-tert-butyl-5-methylcyclopentadienyl)(2,7-di-tert-butylfluorenyl)zirconiumdichloride was weighed into the 5-L four-necked flask in a glove box, and the flask was taken out from the glove box. Then, 0.46 L of toluene and 1.4 L of the $MAO/SiO_2$/toluene slurry prepared by the method of (1) were added into the flask in a nitrogen atmosphere, and the mixture thus obtained was agitated for 30 minutes.

The diphenylmethylene (3-tert-butyl-5-methylcyclopentadienyl)(2,7-di-tert-butylfluorenyl) zirconiumdichloride/ $MAO/SiO_2$ toluene slurry thus obtained was subjected to replacement with use of n-heptane until a replacement ratio became 99%, and 4.5 L of the slurry was obtained finally. This operation was carried out at a room temperature.

(3) Preliminary Polymerization P-1

First, 202 g of the solid catalyst component prepared from (2), 109 mL of triethylaluminum, and 100 L of n-heptane were added to an autoclave (capacity: 200 L) provided with an agitator. While the inside of the autoclave was kept at 15° C. to 20° C., 2020 g of ethylene was added into the autoclave, and was reacted with the mixture for 180 minutes under agitation.

After the polymerization, a solid component was sedimented. After supernatant liquid was removed therefrom, the solid component was washed with n-heptane. The process from the sedimentation to n-heptane washing was carried out twice. Washing ratio of catalyst calculated from the amount of solvent (n-heptane) introduced and the amount of solvent collected was 99%.

The preliminary polymer thus obtained was suspended again in refined n-heptane, thereby obtaining a solution, which was then adjusted by adding n-heptane until a concentration of a solid catalyst component reached 2 g/L. The preliminary polymer was partially sampled and analyzed. The analysis showed that the preliminary polymer obtained contained 10 g of polyethylene per gram of the solid catalyst component.

(4) Pre-Polymerization P-2

Into a tubular polymerization vessel (capacity: 58 L), propylene, hydrogen, the catalyst slurry of the preliminary polymer prepared from (3) above, and triethylaluminum were continuously supplied at the following rates: propylene at a rate of 57 kg/hr, hydrogen at a rate of 4 NL/hr, the catalyst slurry (as a solid catalyst component) at a rate of 7.1 g/hr and triethylaluminum at a rate of 4.0 mL/hr, and were then polymerized in the absence of a gas phase inside the tubular polymerization vessel (full of liquid). The tubular polymerization vessel had a temperature of 30° C. and a pressure of 2.6 MPa(G).

(5) Polymerization P-3

The slurry obtained from the pre-polymerization (4) was supplied to a polymerization vessel (capacity: 1000 L) provided with an agitator, and was further polymerized. The polymerization was carried out in such a manner that propylene and ethylene were supplied into the polymerization vessel at respective rates of 50 kg/hr and 1.6 kg/hr, and hydrogen was also supplied into it so that a concentration of hydrogen became 0.39% by mol in a gas phase in the polymerization vessel. The polymerization was carried out under conditions of a polymerization temperature of 60° C. and a pressure of 2.5 MPa(G).

The slurry thus obtained was supplied to a polymerization vessel (capacity: 500 L) provided with an agitator, and was further polymerized. The polymerization was carried out in such a manner that propylene and ethylene were supplied into the polymerization vessel at rates of 11 kg/hr and 1.1 kg/hr, and hydrogen was also supplied into it so that a concentration of hydrogen became 0.39% by mol in the gas phase in the polymerization vessel. The polymerization was carried out under conditions of a polymerization temperature of 59° C. and a pressure of 2.4 MPa(G).

The slurry thus obtained was subjected to a vaporization process, so that the solid was separated from the gas thereafter. Thus, a propylene.ethylene random copolymer was obtained. The propylene copolymer was vacuum-dried at 80° C.

Note that (i) the propylene.ethylene random copolymer thus obtained had an ethylene content of 5.2% by weight and a homo PP content (polypropylene homopolymer content) of 15% by weight, (ii) a lowest melting peak temperature and a highest melting peak temperature which were obtained by measuring the DSC melting points with use of a heat flux differential scanning calorimeter were respectively 107° C. and 148° C., and (iii) the MFR was 12 g/10 min.

[Production of Resin Particles]

First, 100 parts by weight of the propylene.ethylene random copolymer obtained were blended with (i) 0.1 part by weight of talc [PKS, available from Hayashi-Kasei Co., Ltd] serving as a cell nucleating agent and (ii) 0.5 part by weight of polyethylene glycol [PEG#300, available from Lion Corporation] serving as a water absorbent, and the mixture thus obtained was melted and kneaded in a single screw extruder having a shaft of 50 mm [Model 20VSE-50-28, available from Osaka Seiki Kosaku Co., Ltd.]. Then, a melted and kneaded resin thus obtained was (i) extruded through a circular die to be in the form of a strand, (ii) cooled with water, and (iii) cut with a pelletizer. Thus, polypropylene resin particles of 1.2 mg/particle were obtained.

[Production of Expanded Particles]

First, (i) 100 parts by weight of the polypropylene resin particles obtained, (ii) 200 parts by weight of water, (iii) 0.5 part by weight of tertiary calcium phosphate serving as a dispersant, and (iv) 0.05 part by weight of sodium n-paraffin sulfonate serving as a dispersion auxiliary agent were introduced into a pressure-resistant autoclave (capacity: 10 L), and 6.25 parts by weight of carbon dioxide gas serving as a foaming agent was added to the mixture under agitation. The mixture in the autoclave was heated to a foaming temperature of 134° C., and then carbon dioxide gas was further added to set an internal pressure of the autoclave to 3.0 MPa(G). After that, the pressure was maintained for 30 minutes, and the mixture in the autoclave was released into an atmospheric pressure through an orifice 4.0 mm in diameter by opening a valve provided in a lower part of the autoclave. In this way, first-stage expanded particles were obtained.

Figure 3:
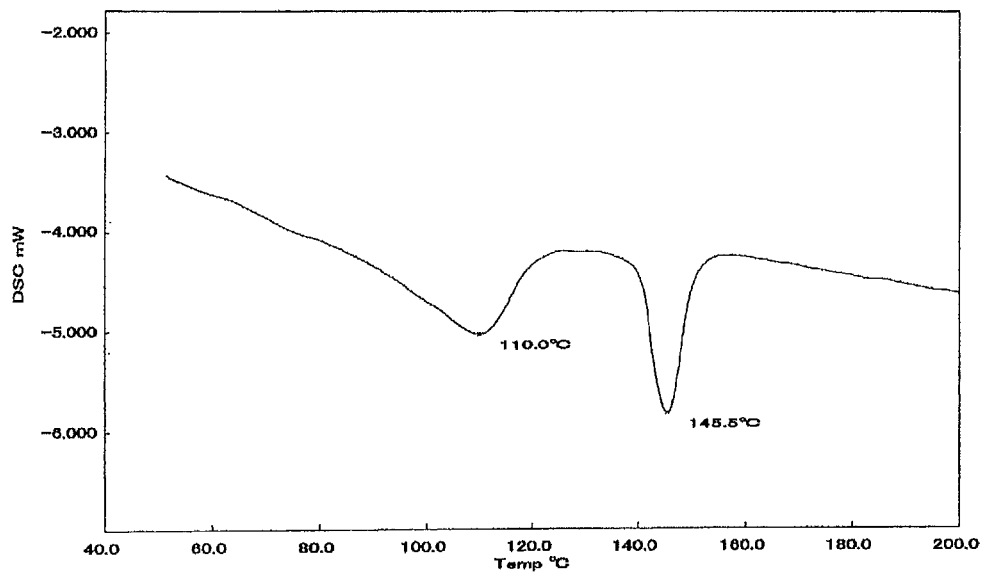
FIG. 3 is a graph illustrating a DSC curve obtained in a first measurement of a temperature rise for polypropylene resin expanded particles of Example 1 in accordance with the present invention.
Figure 4:
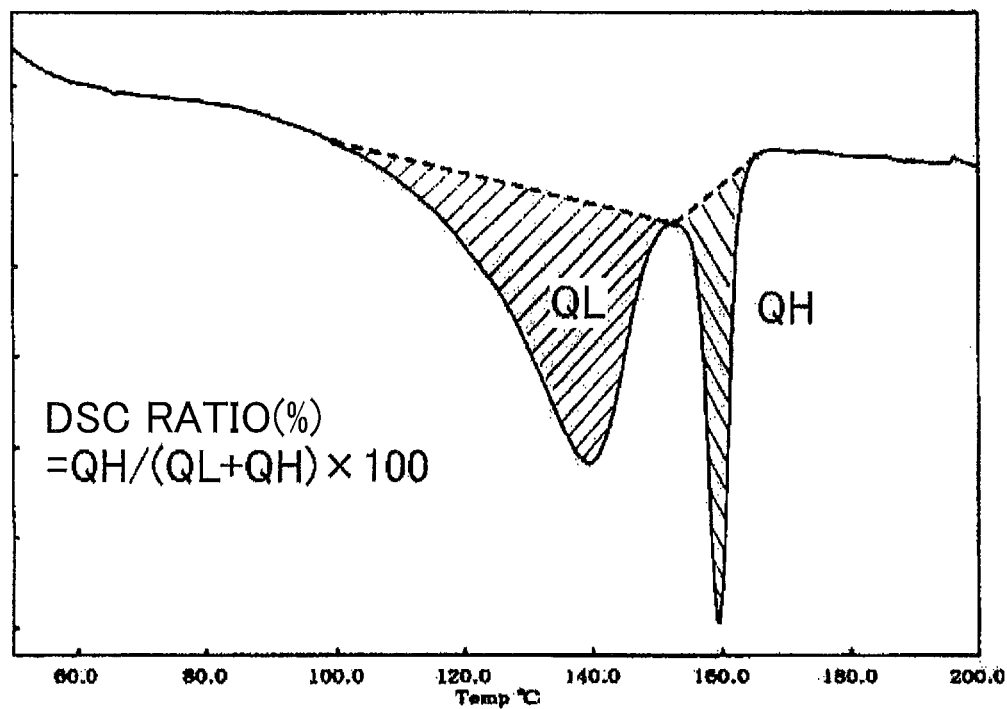
FIG. 4 is a graph schematically illustrating a method of the present invention for calculating ratios [=QH/(QH+QL)×100 (%)] (that is, a resin DSC ratio and an expanded particle DSC ratio) of quantities of heat at melting peaks of a resin and expanded particles on a higher temperature side. The ratios can be calculated from (i) a melting peak heat quantity QL on the lower temperature side, the heat quantity QL being represented by an area enclosed by (a) a melting peak on the lower temperature side and (b) a tangent that extends from a maximum point between the lower temperature side peak and the higher temperature side peak to a baseline from which melting starts and (ii) a melting peak heat quantity QH on the higher temperature side, the heat quantity QH being represented by an area enclosed by (a) a melting peak on the higher temperature side and (b) a tangent that extends from a maximum point between the lower temperature side peak and the higher temperature side peak on the DSC curve to a baseline at which the melting ends.

The first-stage expanded particles obtained had a foaming ratio of 11 times and a DSC ratio of 29%. There were exhibited two melting peaks in a first DSC measurement of the expanded particles. The lowest melting peak temperature was 110° C., whereas the highest melting peak temperature was 145.5° C. (see FIG. 3). An internal pressure of 0.32 MPa was imparted to the first-stage expanded particles by impregnation with air, and the first-stage expanded particles were heated with steam of 0.02 MPa(G). Consequently, expanded particles having a foaming ratio of 27 times was obtained.

[Production of In-Mold Foaming Molded Product]

The polypropylene resin expanded particles obtained was washed with hydrochloric acid aqueous solution (pH=1) and thereafter washed with water, and then was dried at 75° C. The expanded particles were impregnated with pressurized air in a pressure-resistant vessel to set an internal pressure of the particles to 0.2 MPa. Then, in-mold foaming molding was performed under heating steam pressures within the range of 0.09 MPa·G to 0.30 MPa·G with use of (i) a polyolefin foam molding machine [KD-345, available from DAISEN Co., Ltd.,] and (ii) a mold of 400 mm in length×300 mm in width× 50 mm in thickness.

The in-mold foaming molded product obtained was (i) let stand for 1 hour at a room temperature, (ii) dried and cured for 15 hours in a temperature-controlled room at 75° C., and (iii) taken out and let stand for 4 hours at a room temperature again. Then, the range of heating conditions for molding was evaluated on the basis of the fusion between the expanded particles, the surface property, the dimensional shrinkage rate, and the distortion rate.

Table 1 shows the results of the evaluation.

Example 2

[Producing Propylene.Ethylene Random Copolymer with Use of Metallocene Polymerization Catalyst]

A propylene.ethylene random copolymer was obtained in the same manner as Example 1, except that in the polymerization (5), (i) hydrogen was supplied into a polymerization vessel (capacity: 1000 L) so that a concentration of the hydrogen became 0.45% by mol in a gas phase and (ii) hydrogen was supplied into a polymerization vessel (capacity: 500 L) so that a concentration of the hydrogen became 0.45% by mol in a gas phase.

Note that (i) the propylene.ethylene random copolymer thus obtained had an ethylene content of 5.2% by weight and a homo PP content (polypropylene homopolymer content) of 15% by weight, (ii) a lowest melting peak temperature and a highest melting peak temperature which were obtained by measuring the DSC melting points with use of a heat flux differential scanning calorimeter were 107° C. and 148° C. respectively, and (iii) the MFR was 17 g/10 min.

[Production of Resin Particles, Expanded Particles, and In-Mold Foaming Molded Product]

Resin particles, expanded particles, and an in-mold foaming molded product were obtained through the same operation as Example 1, except that the propylene.ethylene random copolymer obtained was used. The in-mold foaming molded product was then evaluated. Table 1 shows the results of the evaluation.

Example 3

[Producing Propylene.Ethylene Random Copolymer with Use of Metallocene Polymerization Catalyst]

A propylene.ethylene random copolymer was obtained in the same manner as Example 1, except that in the polymerization (5), (i) hydrogen was supplied into a polymerization vessel (capacity: 1000 L) so that a concentration of the hydrogen became 0.52% by mol in a gas phase and (ii) hydrogen was supplied into a polymerization vessel (capacity: 500 L) so that a concentration of the hydrogen became 0.52% by mol in a gas phase.

Note that (i) the propylene.ethylene random copolymer thus obtained had an ethylene content of 5.2% by weight and a homo PP content (polypropylene homopolymer content) of 15% by weight, (ii) a lowest melting peak temperature and a highest melting peak temperature which were obtained by measuring the melting points with use of a heat flux differential scanning calorimeter were 108° C. and 148° C. respectively, and (iii) the MFR was 24 g/10 min.

[Production of Resin Particles, Expanded Particles, and In-Mold Foaming Molded Product]

Resin particles, expanded particles, and an in-mold foaming molded product were obtained through the same operation as Example 1, except that the propylene.ethylene random copolymer obtained was used. The in-mold foaming molded product was then evaluated. Table 1 shows the results of the evaluation.

Example 4

[Producing Propylene.Ethylene Random Copolymer with Use of Metallocene Polymerization Catalyst]

A propylene-ethylene random copolymer was obtained in the same manner as Example 1, except that in the polymerization (5), (i) ethylene was supplied into a polymerization vessel (capacity: 1000 L) at a rate of 1.4 kg/hr and hydrogen was also supplied thereinto so that a concentration of the hydrogen became 0.44% by mol in a gas phase and (ii) ethylene was supplied into a polymerization vessel (capacity: 500 L) at a rate of 1.0 kg/hr and hydrogen was supplied thereinto so that a concentration of the hydrogen became 0.44% by mol in a gas phase.

Note that (i) the propylene.ethylene random copolymer thus obtained had an ethylene content of 4.6% by weight and a homo PP content (polypropylene homopolymer content) of 25% by weight, (ii) a lowest melting peak temperature and a highest melting peak temperature which were obtained by measuring the melting points with use of a heat flux differential scanning calorimeter were 107° C. and 148° C. respectively, and (iii) the MFR was 16 g/10 min.

[Production of Resin Particles, Expanded Particles, and In-Mold Foaming Molded Product]

Resin particles, expanded particles, and an in-mold foaming molded product were obtained through the same operation as Example 1, except that the propylene.ethylene random copolymer obtained was used. The in-mold foaming molded product was then evaluated. Table 1 shows the results of the evaluation.

Comparative Example 1

[Producing Propylene.Ethylene Random Copolymer with Use of Metallocene Polymerization Catalyst]

A propylene.ethylene random copolymer was obtained in the same manner as Example 1, except that the prepolymerization (4) was not performed and that in the polymerization (5), (i) ethylene was supplied into a polymerization vessel (capacity: 1000 L) at a rate of 1.6 kg/hr and hydrogen was also supplied thereinto so that a concentration of the hydrogen became 0.31% by mol in a gas phase and (ii) ethylene was supplied into a polymerization vessel (capacity: 500 L) at a rate of 1.1 kg/hr and hydrogen was supplied thereinto so that a concentration of the hydrogen became 0.31% by mol in a gas phase.

Note that (i) the propylene.ethylene random copolymer thus obtained had an ethylene content of 5.1% by weight and a homo PP content (polypropylene homopolymer content) of 0% by weight, (ii) a lowest melting peak temperature which was obtained by measuring the melting point with use of a differential scanning calorimeter was 107° C., and (iii) the MFR was 7 g/10 min.

[Production of Expanded Particles and In-Mold Foaming Molded Product]

Resin particles, expanded particles, and an in-mold foaming molded product were obtained through the same operation as Example 1, except that the propylene.ethylene random copolymer obtained was used. The in-mold foaming molded product was then evaluated. Table 1 shows the results of the evaluation.

Comparative Example 2

[Producing Propylene.Ethylene Random Copolymer with Use of Metallocene Polymerization Catalyst]

A propylene.ethylene random copolymer was obtained in the same manner as Example 1, except that the prepolymerization (4) was not performed and that in the polymerization (5), (i) ethylene was supplied into a polymerization vessel (capacity: 1000 L) at a rate of 1.2 kg/hr and hydrogen was also supplied thereinto so that a concentration of the hydrogen became 0.48% by mol in a gas phase and (ii) ethylene was supplied into a polymerization vessel (capacity: 500 L) at a rate of 0.8 kg/hr and hydrogen was supplied thereinto so that a concentration of the hydrogen became 0.48% by mol in a gas phase.

Note that (i) the propylene.ethylene random copolymer thus obtained had an ethylene content of 3.8% by weight and a homo PP content (polypropylene homopolymer content) of 0% by weight, (ii) a lowest melting peak temperature which was obtained by measuring the melting point with use of a heat flux differential scanning calorimeter was 117° C., and (iii) the MFR was 20 g/10 min.

[Production of Resin Particles, Expanded Particles, and In-Mold Foaming Molded Product]

Resin particles, expanded particles, and an in-mold foaming molded product were obtained through the same operation as Example 1, except that the propylene.ethylene random copolymer obtained was used. The in-mold foaming molded product was then evaluated. Table 1 shows the results of the evaluation.

Comparative Example 3

[Production of Resin Particles, Expanded Particles, and In-Mold Foaming Molded Product]

Resin particles, expanded particles, and an in-mold foaming molded product were obtained through the same operation as Example 1, except that a propylene.ethylene random copolymer (F744NP, available from Prime Polymer Co., Ltd.) (ethylene content is 4.1% by weight; a single lowest melting peak temperature obtained by measuring the melting point using a heat flux differential scanning calorimeter is 134° C.; and the MFR is 7 g/10 min) which had been produced by polymerization involving use of a Ziegler polymerization catalyst was used as a polypropylene resin. The molded product was then evaluated. Table 1 shows the results of the evaluation.

Comparative Example 4

[Production of Resin Particles, Expanded Particles, and In-Mold Foaming Molded Product]

Resin particles, expanded particles, and an in-mold foaming molded product were obtained through the same operation as Example 1, except that a propylene.ethylene.1-butene random copolymer (ethylene content is 2.4% by weight; 1-butene content is 3.7% by weight; a single lowest melting peak temperature obtained by measuring the melting point with use of a heat flux differential scanning calorimeter is 133° C.; and the MFR is 7 g/10 min) (F337D, available from Prime Polymer Co., Ltd.) which had been produced by polymerization involving use of a Ziegler polymerization catalyst was used as a polypropylene resin. The molded product was then evaluated. Table 1 shows the results of the evaluation.

TABLE 1

| | | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| Base material resin | Polymerization catalyst | Metallocene | Metallocene | Metallocene | Metallocene | Metallocene | Metallocene | Ziegler | Ziegler | Metallocene + Ziegler |
| | Comonomer type | Ethylene | Ethylene | Ethylene | Ethylene | Ethylene | Ethylene | Ethylene | Ethylene/1-Butene | Ethylene |
| | Comonomer content (wt %) | 5.2 | 5.2 | 5.2 | 4.6 | 5.1 | 3.8 | 4.1 | 2.4/3.7 | 5.2 |
| | Mw/Mn | 3.3 | 2.8 | 2.7 | — | 1.9 | 2.1 | 5.4 | 4.6 | — |
| | MFR (g/10 min) | 12 | 17 | 24 | 16 | 7 | 20 | 7 | 7 | 10 |
| | Homo PP content (wt %) | 15 | 15 | 15 | 25 | 0 | 0 | 0 | 0 | 15 |
| | Lowest peak temperature (° C.) | 107 | 107 | 108 | 107 | 107 | 117 | — | — | 110 |
| | Intermediate peak temperature (° C.) | 134 | 134 | 135 | 137 | — | — | — | — | — |
| | Highest peak temperature (° C.) | 148 | 148 | 148 | 148 | 118 | 126 | — | — | 164 |
| | Single peak temperature (° C.) | — | — | — | — | — | — | 134 | 133 | — |
| | Resin DSC ratio change rate (%/° C.) | 1.4 | 1.5 | 1.6 | 2.0 | 3.2 | 3.9 | 5.9 | 6.6 | 3.3 |
| Expanded particles | Foaming agent | $CO_2$ | $CO_2$ | $CO_2$ | $CO_2$ | $CO_2$ | $CO_2$ | $CO_2$ | $CO_2$ | $CO_2$ |
| | Foaming temperature (° C.) | 134 | 133 | 133 | 133 | 135 | 127 | 136 | 136 | 153 |
| | First-stage foaming ratio (times) | 11 | 13 | 14 | 14 | 9 | 12 | 11 | 10 | 11 |
| | First-stage expanded particle DSC ratio (%) | 29 | 26 | 26 | 26 | 20 | 20 | 28 | 26 | 28 |
| | Lowest peak temperature (° C.) | 110 | 110 | 109 | 112 | 109 | 120 | 129 | 125 | 110 |
| | Highest peak temperature (° C.) | 146 | 146 | 142 | 151 | 129 | 138 | 150 | 144 | 165 |
| | High/low temperature peak temperature difference (° C.) | 36 | 36 | 33 | 39 | 20 | 18 | 21 | 19 | 55 |
| | Second-stage foaming ratio (times) | 27 | 28 | 28 | 28 | 28 | 28 | 29 | 28 | 28 |
| | Second-stage expanded particle average cell diameter (μm) | 258 | 264 | 240 | 212 | 164 | 218 | 243 | 276 | 124* |
| | Second-stage expanded particle cell structure | Uniform | Uniform | Uniform | Uniform | Uniform | Uniform | Uniform | Uniform | Ununiform* |
| In-mold foaming molded product | Molded product density (g/L) | 21 | 20 | 20 | 20 | 20 | 20 | 20 | 20 | 20 |
| | Molded product 50% compressive strength | G | G | G | G | P | G | G | G | P |
| | Lowest molding pressure (MPa) | 0.12 | 0.12 | 0.12 | 0.15 | 0.12 | 0.18 | 0.22 | 0.24 | 0.15 |
| | Highest molding pressure (MPa) | 0.26 | 0.26 | 0.24 | 0.28 | 0.14 | 0.22 | 0.28 | 0.30 | 0.18 |
| | Range of heating conditions for molding (MPa) | 0.14 | 0.14 | 0.12 | 0.13 | 0.02 | 0.04 | 0.06 | 0.06 | 0.03 |
| | Molding range evaluation | G | G | G | G | P | P | F | F | P |

*Second-stage expanded particles in Comparative Example 5 have a cell structure in which among fine cells, coarse cells measuring 300-600 μm lie scattered.

In Examples 1 to 4, lowest mold heating steam pressures were 0.12 MPa to 0.15 MPa, which were as extremely low as a mold heating steam pressure of polyethylene resin, and ranges of heating conditions for molding were large (0.10 MPa or larger). In contrast, in Comparative Examples 1 and 2, although lowest mold heating steam pressures were low (0.12 MPa and 0.18 MPa, respectively), ranges of heating conditions for molding were small (0.02 MPa and 0.04 MPa, respectively).

In Comparative Examples 3 and 4, each involving a resin produced by polymerization involving use of a Ziegler polymerization catalyst, resin melting points were 133° C. to 134°

C., which were low for a resin produced by polymerization involving use of a Ziegler polymerization catalyst. However, lowest mold heating steam pressures were high (0.22 MPa to 0.24 MPa), and ranges of heating conditions for molding were evaluated as "F" (0.06 MPa).

Comparative Example 5

[Production of Base Material Resin]

A blended resin was obtained as a polypropylene resin by blending, with use of a twin-screw extruder, (i) 85% by weight of the propylene.ethylene random copolymer polymerized with use of a metallocene catalyst in Comparative Example 1 with (ii) 15% by weight of a polypropylene homopolymer (having a melting point of 165° C. and an MFR of 8.0 g/10 min) produced by polymerization involving use of a Ziegler polymerization catalyst.

[Production of Resin Particles, Expanded Particles, and In-Mold Foaming Molded Product]

Resin particles, expanded particles, and an in-mold foaming molded product were obtained through the same operation as Example 1, except that the blended resin obtained was used. The in-mold foaming molded product was then evaluated. Table 1 shows the results of the evaluation.

The expanded particles thus obtained had an ununiform cell structure and a high open cell ratio of 14.5% (normally, approximately lower than 5%). During the in-mold foaming molding, the lowest mold heating steam pressure was low (0.15 MPa). However, when the mold heating steam pressure was increased, the expanded particles were deformed and shrank largely, and the range of heating conditions for molding was extremely small.

The invention claimed is:

1. Polypropylene resin expanded particles comprising:
   a polypropylene resin as a base material resin,
   the polypropylene resin having at least three melting peaks on a DSC curve for a second temperature rise measured at a heating rate of 10° C./min with use of a heat flux differential scanning calorimeter (DSC), the at least three melting peaks including (i) a lowest temperature melting peak of not lower than 100° C. and not higher than 130° C. and (ii) a highest temperature melting peak of not lower than 140° C. and not higher than 160° C.,
   the polypropylene resin having a resin DSC ratio change rate of 0.5%/° C. to 3.0%/° C.,
   the expanded particles having two melting peaks in a DSC measurement made at a first temperature rise at the heating rate of 10° C/min, the two melting peaks including, (i) on a lower temperature side, a melting peak temperature of not lower than 100° C. and not higher than 130° C. and, (ii) on a higher temperature side, a melting peak temperature of not lower than 140° C. and not higher than 160° C.

2. The polypropylene resin expanded particles according to claim 1,
   wherein:
   the polypropylene resin includes a polypropylene random copolymer resin produced by polymerization involving use of a metallocene polymerization catalyst.

3. The polypropylene resin expanded particles according to claim 2,
   wherein:
   the polypropylene resin includes (i) the polypropylene random copolymer resin produced by the polymerization involving use of a metallocene polymerization catalyst and (ii) a polypropylene homopolymer produced by polymerization involving use of a metallocene polymerization catalyst.

4. The polypropylene resin expanded particles according to claim 2,
   wherein:
   the polypropylene resin is produced by a multi-stage polymerization involving use of a metallocene polymerization catalyst.

5. The polypropylene resin expanded particles according to claim 2, wherein
   the metallocene polymerization catalyst includes a metallocene compound represented by Formula 1 below,

[Chem. 1]

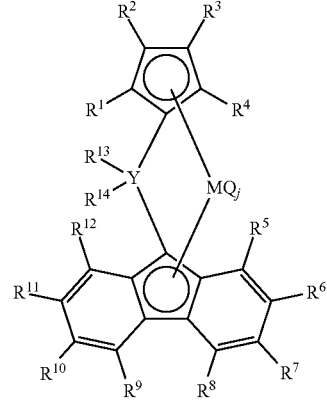

Formula 1 where $R^1, R^2, R^3, R^4, R^5, R^6, R^7, R^8, R^9, R^{10}, R^{11}, R^{12}, R^{13}$, and $R^{14}$ each identically or differently represent one selected from the group consisting of a hydrogen atom, a hydrocarbon group, and a silicon-containing group; M represents a group-4 transition metal; Y represents a carbon atom or a silicon atom; Q is selected from the group consisting of a halogen, a hydrocarbon group, an anion ligand, and a neutral ligand coordinatable with a lone pair of electrons; and j represents an integer of 1 to 4 and when j is 2, 3, or 4, each Q is identical or different.

6. A polypropylene resin in-mold foaming molded product produced by in-mold foaming molding of polypropylene resin expanded particles according to claim 1.

* * * * *